J. C. OSGOOD.
TILTING WAGON.
No. 1,348.  Patented Sept. 28, 1839.
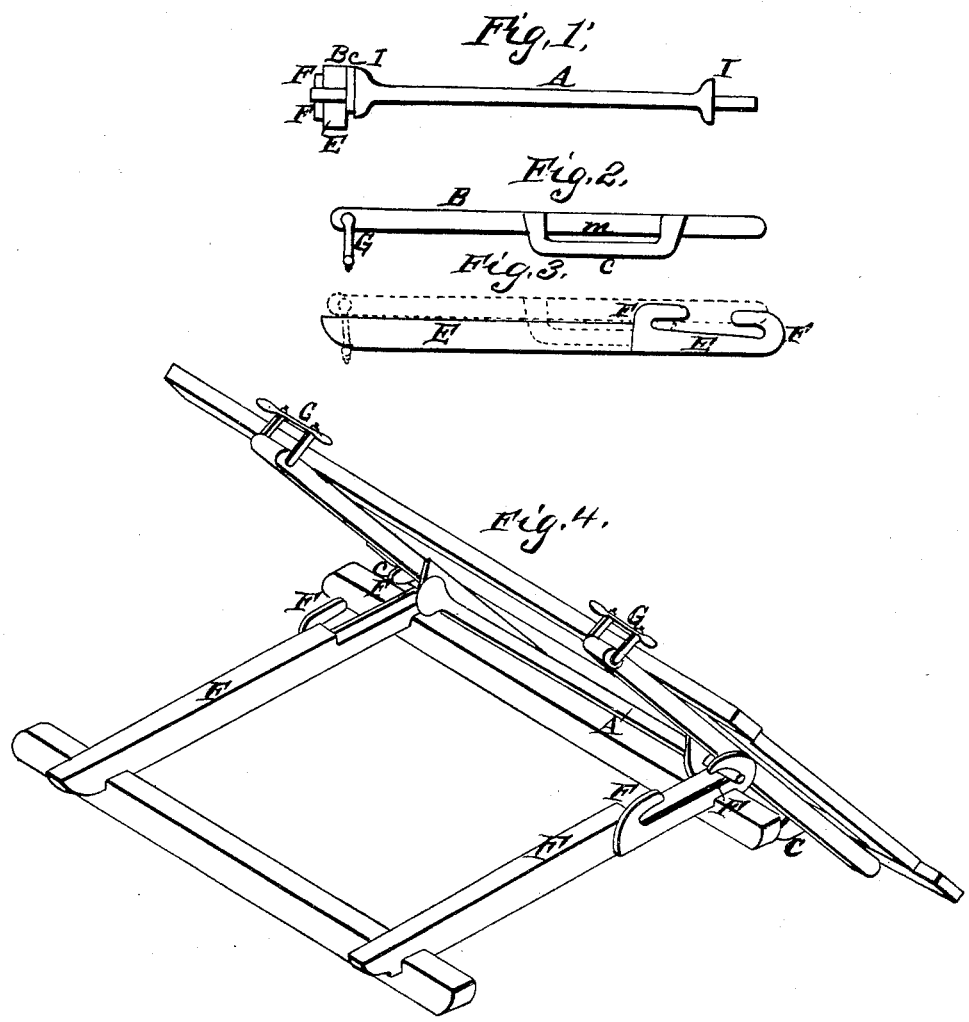

UNITED STATES PATENT OFFICE.

JASON C. OSGOOD, OF CHITTENANGO, NEW YORK.

MODE OF ATTACHING BODIES OR BOXES TO WAGONS, CARS, &c., TO FACILITATE THE TILTING OF THE SAME.

Specification of Letters Patent No. 1,348, dated September 28, 1839.

*To all whom it may concern:*

Be it known that I, JASON C. OSGOOD, of Chittenango, Madison county, State of New York, have invented a new and Improved Method of Attaching Bodies or Boxes to Wagons, Cars, &c., to Facilitate the Tilting of the Same; and I do hereby declare that the following is a full and exact description thereof, reference being had to the annexed drawings of the same, making part of this specification.

Figure 1 represents the truck or traveling roller; Fig. 2, one of the cross bars attached to the body of the wagon or car; Fig. 3, one of the cross bars of the wagon, carriage or car frame; Fig. 4, tilting hooks, traveling roller, clasps, body frame attached.

Similar letters refer to similar parts in the figures.

The nature of this invention consists in the employment of a traveling roller combined with the body frame of a car, wagon or other carriage for tilting the body.

The traveling roller on which the wagon or car body moves (marked A in the annexed drawings) is composed of a cylindrical bar of metal somewhat longer than the width of the car frame and of any convenient diameter having circular collars H—one near each end to keep it in its proper place between the body and frame, said collars of the roller being brought close up against two metallic plates C fastened to the wagon or car body, said plates bent at the ends in such a manner as to form oblong mortises in between them and the under side of the body through which the roller A passes and in which it travels, said plates serving to attach the roller to the wagon body. This roller travels over the parallel side or end pieces of the car or wagon frame (marked E), which serves as ways at E′, the wagon or car body and its load being supported by said roller. The parallel ways are cut away and sloped at the places where the rollers travel (marked E′), and to prevent the roller moving too far either way. Metallic plates with hooks F formed at each end are fastened to the side of said ways.

In Fig. 4, the frame of the body is represented in a tilting position, the body having been moved on the roller until the greater part of the load is outside or beyond the roller, when the weight of the same will of course cause the body to tilt and discharge the load. In this position the roller will rest against or in the outside lower hooks F attached to the car or wagon frame and against the end of the oblong mortise $m$ under the body toward the clevis $a$, hereafter described. The load being discharged the body will be brought into the horizontal position, as represented by dotted lines in Fig. 3, and run back to its former position, when it will be found that the position of the traveling roller will be reversed, being now against the inner lower hook and end of mortise farthest from the clevis.

The clevis or lock G for holding the body down consists of two parallel straps attached to the ends of a round bolt passing through a bar of the tilting body, and secured by nuts. This clevis or lock is movable and hangs down over one end of the way E thus holds the body to its place while receiving its load.

What I claim as my invention and desire to secure by Letters Patent consists in—

The employment of a traveling roller so constructed as to catch upon the tilting hooks and retained by the guides attached to the cross bars, in combination with the body and car or wagon frames as herein described.

JASON C. OSGOOD.

Witnesses:
WM. P. ELLIOT,
EDMD. MAHER.